US006964513B1

(12) United States Patent
Agnoff

(10) Patent No.: US 6,964,513 B1

(45) Date of Patent: Nov. 15, 2005

(54) CYLINDER WATCH WINDER

(76) Inventor: Charles Agnoff, 1221 Great Oaks Dr., Wilmington, NC (US) 28405

(*) Notice: Subject to any disclaimer, the term of this patent is extended or adjusted under 35 U.S.C. 154(b) by 0 days.

(21) Appl. No.: 11/008,487

(22) Filed: Dec. 9, 2004

(51) Int. Cl.[7] .......................... G09B 3/00; G09D 3/00; B01F 11/00

(52) U.S. Cl. .......................... 368/206; 81/7.5

(58) Field of Search .......................... 368/206–210, 368/216; 81/7.5

(56) References Cited

U.S. PATENT DOCUMENTS

| | | | | |
|---|---|---|---|---|
| 2,588,042 | A * | 3/1952 | Poltrock | 81/7.5 |
| 2,917,955 | A * | 12/1959 | Leger | 81/7.5 |
| 3,620,007 | A * | 11/1971 | Kauffman | 368/206 |
| 4,057,958 | A * | 11/1977 | Wuntch | 368/207 |
| 5,608,693 | A * | 3/1997 | Richards | 368/10 |
| 5,988,871 | A * | 11/1999 | Bonnet | 368/206 |
| 6,254,270 | B1 * | 7/2001 | Agnoff | 368/206 |
| D452,256 | S * | 12/2001 | Wolf | D15/199 |
| 6,439,761 | B1 * | 8/2002 | Agnoff | 368/206 |
| 6,543,929 | B1 * | 4/2003 | Agnoff | 368/206 |
| D492,952 | S * | 7/2004 | Siu | D15/199 |
| 6,910,802 | B2 * | 6/2005 | Rustioni | 368/206 |

FOREIGN PATENT DOCUMENTS

WO WO 200017713 A * 3/2000 ................ 368/206

* cited by examiner

*Primary Examiner*—Vit Miska
*Assistant Examiner*—Jeanne-Marguerite Goodwin
(74) *Attorney, Agent, or Firm*—MacCord Mason PLLC

(57) ABSTRACT

A watch winder includes a watch carrier that is freely supported on a rest for ease in mounting and removing the carrier and for reversing the direction of winding by simply turning the watch carrier end-to-end. The watch carrier includes a cylinder and a watch holder insertable into the interior of the cylinder. The rest is adapted to support the cylinder in a horizontal position, and includes first and second support sections having parallel longitudinal axes spaced from each other at a distance less than the diameter of the cylinder. Each section includes a housing having rollers or other support surfaces adjacent the ends of the housing, with at least one of the rollers being driven by an electric motor to rotate the cylinder at predetermined times when the cylinder is supported on the rollers. A feature of the cylinder may be detected to stop rotation at a predetermined orientation.

25 Claims, 5 Drawing Sheets

CYLINDER WATCH WINDER

BACKGROUND OF THE INVENTION (1) Field of the Invention

The present invention relates generally to automatic watch winders for winding self-winding watches, and in particular to watch winders enabling easy mounting and removal of the watch, and the ability to position the watch carrier in either direction so that watches with different winding characteristics, e.g., clockwise or counterclockwise rotation, can be wound on the same watch winder without changing the settings of the watch winder.

(2) Description of the Prior Art

The winding mechanism of a self-winding watch is comprised of a bearing mounted pendulum or rotor that is connected through a gear reduction system to the mainspring of the watch. Generally, the rotor can rotate 360° in either direction. However, there are also so-called "hammer" shaped rotors in older self-winding watches that have a limited travel of 150° to 220° rotation. In either case when the watch is worn, the user's random and often rapid arm movements cause the rotor to swing back and forth inertially in both directions around the rotor axis, thereby winding the watch spring. The watch spring generally stores sufficient energy to keep the watch operating 36–48 hours, whether worn or not. Thus, when worn daily, the watch will be sufficiently wound to maintain continuous operation. However, if the watch is not worn regularly, the user must wind the watch, either manually or with a watch winder, or the watch will stop.

Watch winders are typically comprised of an electric drive mechanism that rotates a watch carrier adapted to hold a watch with the plane of the watch perpendicular to the axis of rotation. That is, the rotor axis is parallel to the axis of rotation of the drive mechanism, so that the watch rotates in the same plane as the hands of the watch. During the period of activation, the watch is partially or completely rotated several times either in a clockwise or counter-clockwise direction or, alternately, reversing in both directions. The powered rotation of the watch is controlled to limit the turns per day (TPD) to prevent damage or malfunction due to the forces exerted on the winding mechanism.

While various types of watch winders have been described in the prior art, there is still a need for a watch winder enabling easy mounting and removal of the watch, and the ability to rotate the watch in either direction so that watches of different designs can be wound on the same watch winder without changing the settings of the watch winder.

SUMMARY OF THE INVENTION

Generally, the watch winder of the present invention is comprised of a watch carrier and a rest to support and rotate the watch carrier for predetermined periods at selected times. The watch carrier is freely supported on the rest. The term "freely supported" as used herein means that the watch carrier is only secured to the rest by the weight of the watch carrier. As a result, the carrier can be quickly removed or replaced with another watch carrier, or reversed, i.e., turned end-to-end to reverse the direction of rotation of the carrier and any watch supported within the carrier.

The watch carrier is comprised of a horizontal cylinder or drum, i.e., a cylinder having a given diameter, a longitudinal axis, a continuous outer wall of a given length, and a watch holder insertable into the cylinder's interior through either end of the cylinder. The cylinder may be closed at one end. As will be described hereinafter, the cylinder preferably includes radial flanges extending outwardly from each end to position the cylinder on the rest.

Preferably, the watch holder has an outer watch-carrying face that is perpendicular to the longitudinal axis of the cylinder so that the watch can be mounted with the watch face and the plane of rotation of the rotor perpendicular to the longitudinal axis of the cylinder. The holder may be of various constructions so long as it is insertable into the cylinder. The holder is preferably compressible to facilitate attachment and removal of a watch. For example, all or a part of the holder may be made of foam or other compressible material, or all or a part of the holder may be constructed of rigid spring-loaded sections that can be compressed.

The cylinder rest is adapted to freely support the cylinder in a horizontal position and includes at least one drive surface positioned to engage and rotate the cylinder when the cylinder is supported on the rest. While the drive surface is described in the preferred embodiment as a roller, it will be appreciated that other drive surfaces, e.g., a belt, may also be used. The drive surface is rotated by an electric motor while engaging the cylinder wall, causing the cylinder to rotate. The engagement may be a frictional engagement, or a geared engagement with the drive surface and cylinder wall including outwardly projecting, meshing gears. When a frictional engagement is used, either the drive surface or cylinder outer wall, or both, will be covered with a non-slippery material, e.g., rubber or polyurethane.

In a preferred embodiment, the rest is comprised of first and second support sections having parallel longitudinal axes spaced from each other at a distance less than the given diameter of the cylinder. Each support section includes opposed ends and rollers adjacent the ends. The rollers of each section are perpendicular to and axially aligned with the section longitudinal axis, with all of the rollers having upper edges in a common horizontal plane. Thus, the cylinder will freely rest horizontally on the upper periphery of the rollers. At least one of the rollers is a drive roller positioned to engage the outer wall of the cylinder to rotate the cylinder when the cylinder is supported on the rollers. The support section including the drive roller, or both sections, may also include a housing between the rollers. The housing may be, for example, a cylindrical housing having a diameter less than the diameters of the rollers.

The housing of the support section including the drive roller may enclose the electric motor used to rotate the drive roller. The motor may be directly connected to the drive wheel by mounting the drive roller on the shaft of the motor, or the motor may be connected through intermediate gearing. The motor in turn is connected in a circuit with a power source, e.g., a battery or other electric power supply, a switch to open and close the circuit, and a programmable controller to control the frequency, direction, and length of time that the motor is energized. The battery and controller may be mounted in an enclosure with the rest being mounted on top of the enclosure. In this case, the connection of the battery and controller to the motor may be through one of the mounts for the support section including the motor, thereby hiding the source of rotation of the cylinder. The switch may be mounted on the exterior of the enclosure. The battery may also be mounted remotely.

In operation, the user mounts a watch on the watch holder, e.g., by compressing the holder and slips the watch band around the holder with the watch face being positioned on the outer face of the holder. The holder is then inserted into either end of the cylinder with the watch recessed slightly from the cylinder end. The cylinder is then placed on the rest so that the rollers contact the surface of the cylinder. The motor is then energized either by the controller or manually with the switch, causing the cylinder to rotate.

As the cylinder rotates, the watch carried on the watch holder also rotates. The rotor, however, hangs downward and does not rotate. Therefore, the watch is wound due to the relative movement of the watch mechanism and the rotor. The motor is then de-energized after a time sufficient to wind the watch, thereby preventing potential damage to the watch mechanism. Some watches are designed to be wound clockwise, while other watches are designed to be wound counterclockwise. Both types of watches can be wound by the present invention without reversing the direction of the motor by simply reversing the orientation of the cylinder, i.e., by turning the cylinder end-to-end. The controller can also be programmed to reverse the direction of the motor at timed intervals.

The watch winder may also include an LED display to display the correct time and/or display the time a watch is wound, or the number of rotations of cylinder. A dip switch can be included to control the number of times that the winder is activated, or the cylinder turned, during a day or other given time period.

The watch winder can also include a sensor in the control circuit, with the sensor being programmed to detect a detectable feature on the cylinder. The controller can be programmed to open the circuit when the detectable feature is detected by the sensor at a predetermined location. For example, the circuit can be programmed to open when the detectable feature is aligned with the sensor after a predetermined number of rotations, thereby positioning the cylinder at a desired orientation when the circuit is opened, so that the watch carried on holder is displayed in the upright position. The sensor can also be used as a counter to sense the number of rotations of the cylinder. The detectable feature of the cylinder may be, for example, a reflective dot on the surface of the cylinder wall.

DETAILED DESCRIPTION OF THE INVENTION

Figure 1:
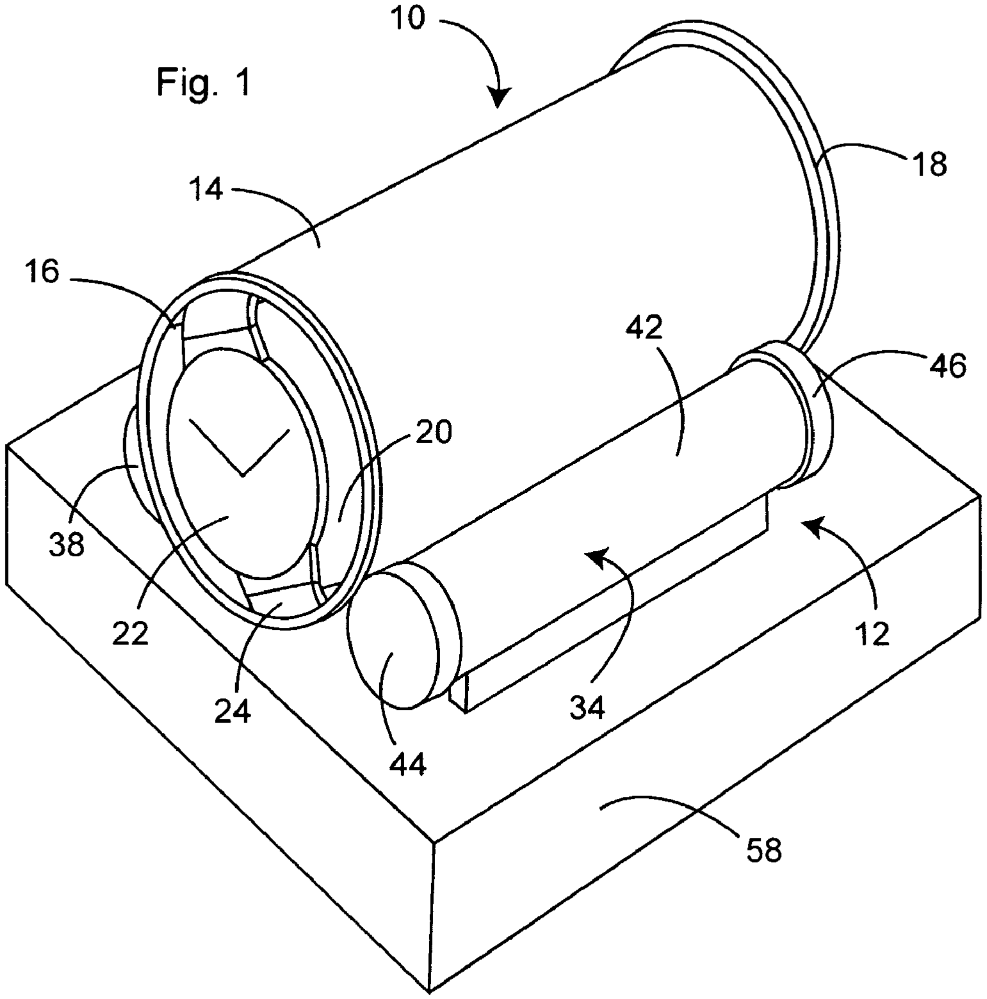
FIG. 1 is a perspective view of the cylinder watch winder.
Figure 2:
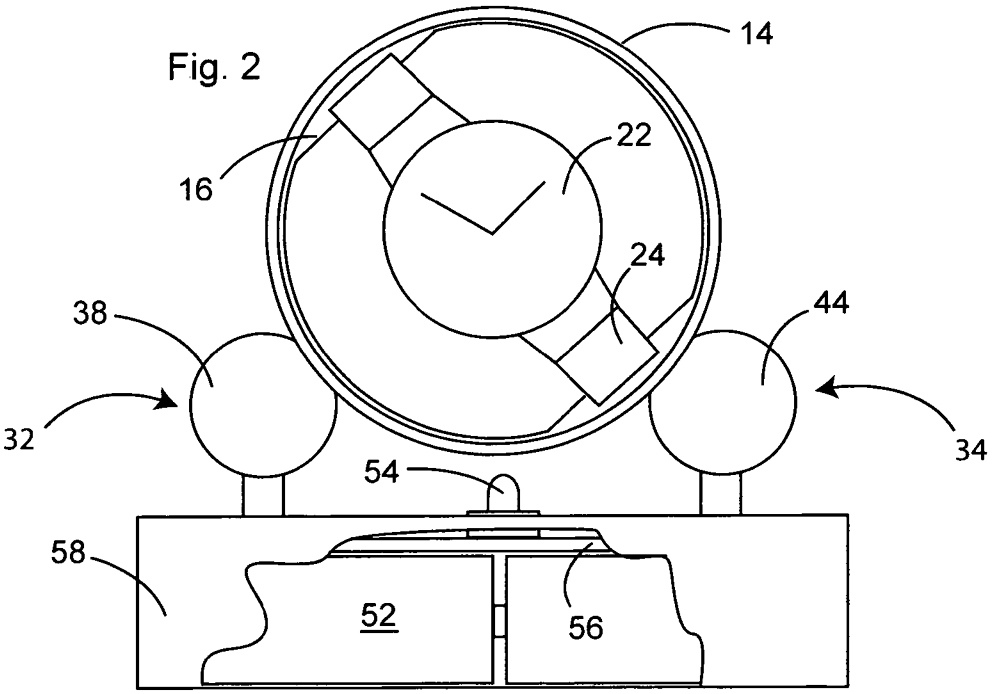
FIG. 2 is a front view of the watch winder of FIG. 1, with a cut-away section to show the interior of the lower enclosure.
Figure 3:
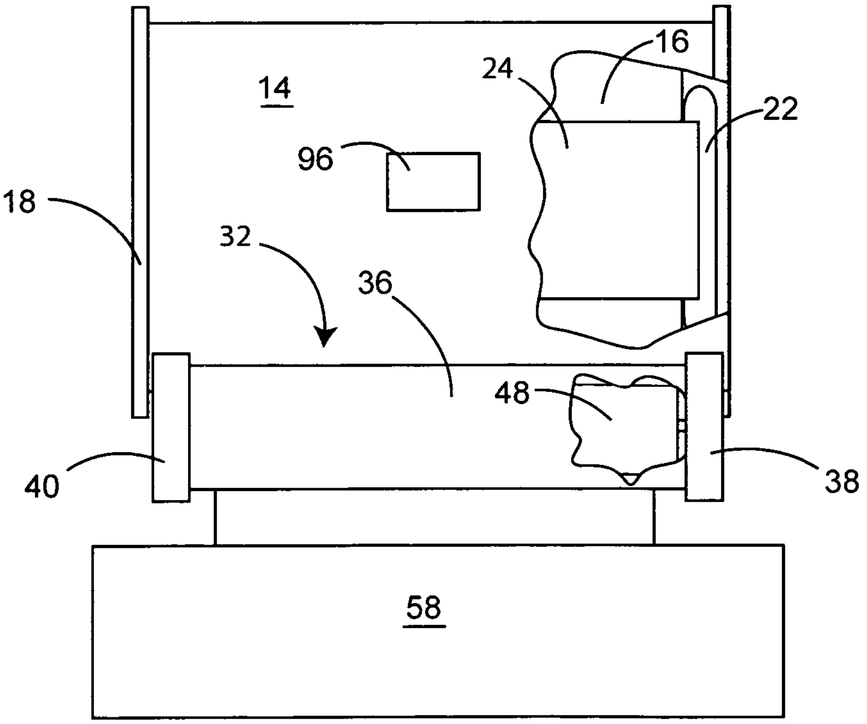
FIG. 3 is a side view of the watch winder of FIG. 1.

As best illustrated in FIGS. 1–3, a preferred embodiment of the watch winder of the present invention is comprised of a watch carrier, generally 10, and a rest, generally 12, to freely support watch carrier 10. Watch carrier 10 is comprised of horizontal cylinder 14 having a given diameter, a longitudinal axis, a continuous outer wall of a given length, an interior chamber defined by the inner wall of cylinder 14, and opposed ends, and watch holder 16 insertable into the interior chamber of cylinder 14. Cylinder 14 includes radial flanges 18 adjacent its ends.

Watch holder 16 includes watch-carrying face 20 perpendicular to the longitudinal axis of cylinder 14 so that watch 22 with watchband 24 can be mounted with the watch face and the plane of rotation of the rotor perpendicular to the longitudinal axis of cylinder 14. Holder 16 may be of various constructions so long as it is insertable into cylinder 14.

Rest 12 is comprised of first and second support sections 32 and 34, respectively, having parallel longitudinal axes spaced from each other at a distance less than the given diameter of cylinder 14. First support section 32 includes cylindrical housing 36 having opposed ends and rollers 38 and 40 adjacent the ends of housing 34. Similarly, second support section 34 includes cylindrical housing 42 having opposed ends and rollers 44 and 46 adjacent the ends of housing 42. Roller 38 is a drive roller positioned to engage the outer wall of cylinder 14 to rotate cylinder 14 when cylinder 14 is freely supported on the upper peripheral surfaces of rollers, 38, 40, 44 and 46.

Housing 34 encloses electric motor 48 used to rotate drive roller 38 mounted on shaft 50 of motor 48. Motor 48 is also connected in a circuit with batteries 52, switch 54, and programmable controller 56, which is programmed to control the frequency and length of time that motor 48 is energized, and its direction of rotation. Batteries 52 and controller 56 are mounted in enclosure 58.

Figure 4:
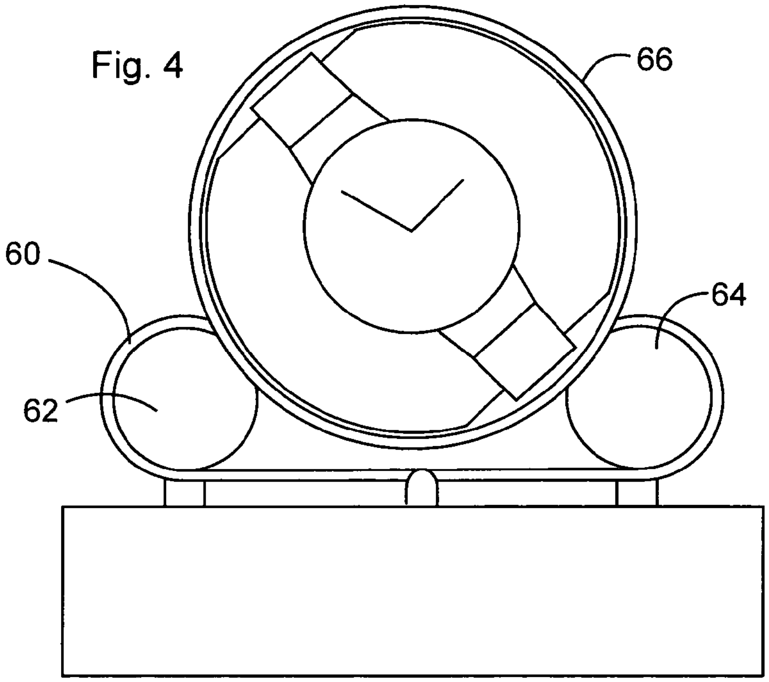
FIG. 4 is a front view of another embodiment of the invention using a belt drive.

FIG. 4 illustrates an alternative embodiment of the invention in which continuous belt 60 is positioned around rollers 62 and 64, with cylinder 66 resting on the upper surface of belt 60. Rotation of drive roller 62 rotates belt 60 and roller 64, and thereby cylinder 66.

Figure 5:
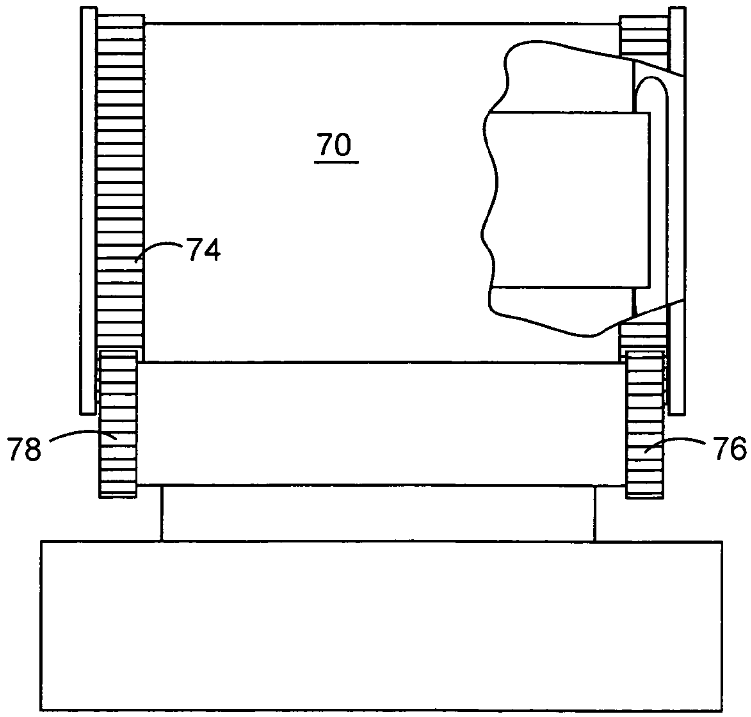
FIG. 5 is a side view of still another embodiment of the invention using a gear drive.

FIG. 5 illustrates still another embodiment in which cylinder 70 includes radial gears 72 and 74, and rollers 76 and 78 include radial gear teeth meshing with the teeth of radial gears 72 and 74. Thus, rotation of drive roller 76 causes rotation of cylinder 70 through interaction of the gear teeth.

Figure 6:
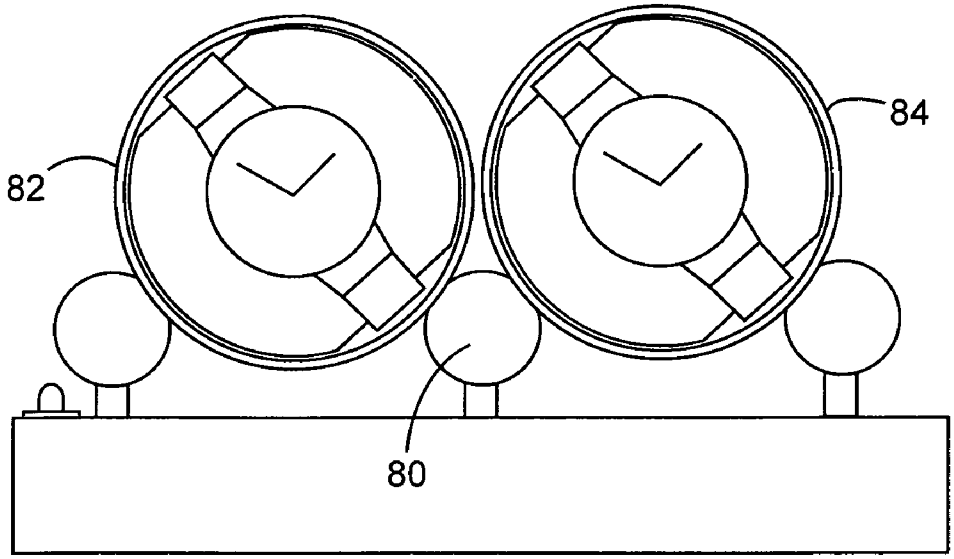
FIG. 6 is a front view of still another embodiment of the invention for use in simultaneously winding two watches.
Figure 7:
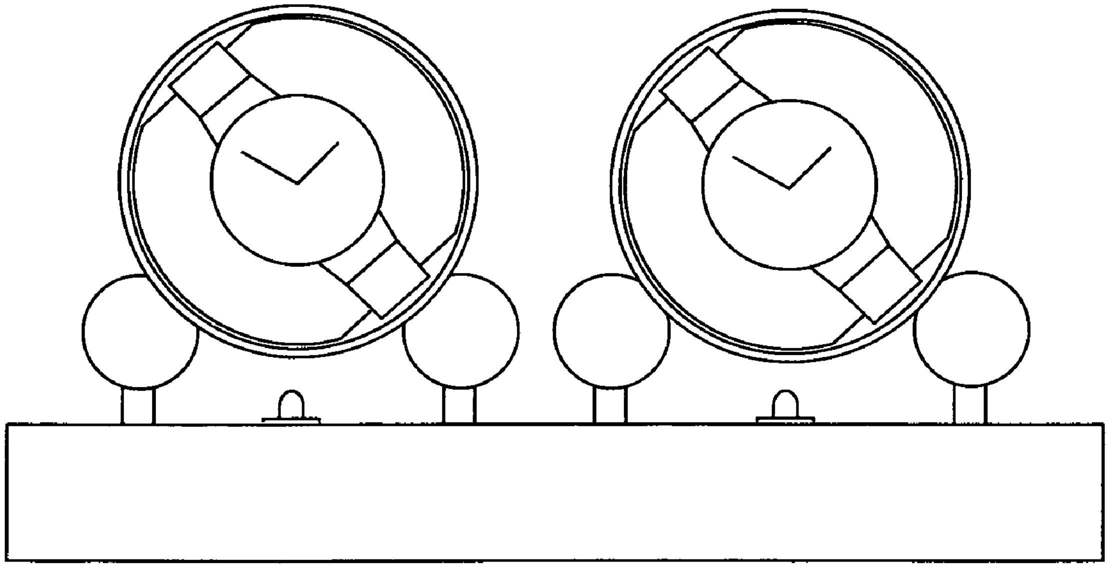
FIG. 7 is a front view of still another embodiment of the invention showing two watch winders mounted on a common base.

FIG. 6 illustrates an embodiment designed to simultaneously rotate two cylinders, and thereby permit simultaneous winding of two watches. In the embodiment, roller 80 engages the outer walls of both cylinders 82 and 84. It will be understood that this concept can be expanded to more than two watches, and that the cylinders can be rotated by separately powered rollers, or by other drive means such as those shown in the other embodiments described herein.

Figure 8:
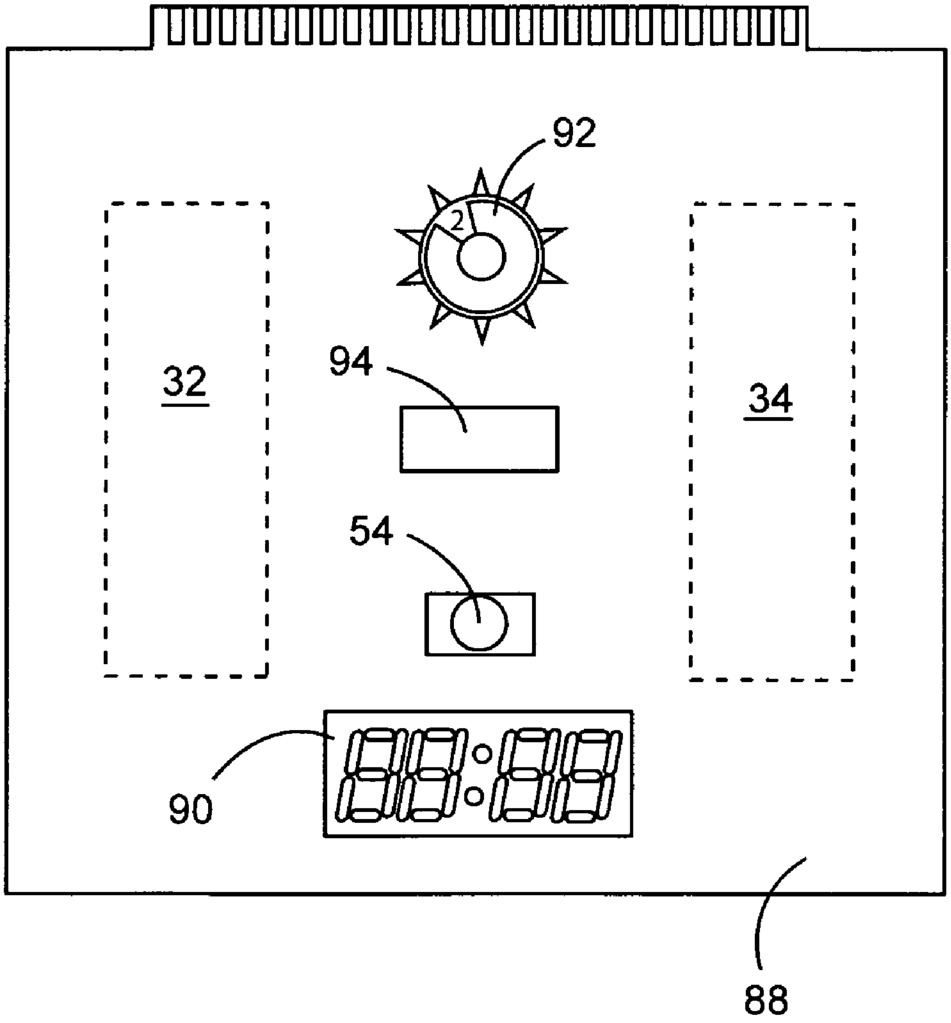
FIG. 8 is a circuit board mountable on the upper surface of the watch winder enclosure.

FIG. 8 illustrates circuit board 88 mountable on the upper surface of watch winder enclosure 58. Board 88 includes LED display 90, which can be used to display the correct time as a convenience to the user in setting the time of watches being wound, and can also be used to display the time a watch is wound, or the number of rotations of cylinder 16, depending on how display 90 is programmed. Dip switch 92 can be set to different positions to control the number of times that the winder is activated, or the cylinder turned, during a day or other given time period.

Sensor 94, shown in the preferred embodiment as an optical sensor, is programmed to serve as a counter, sensing the number of times reflective surface 96 shown on the outer wall of cylinder 16 in FIG. 3 moves over sensor 94. Sensor 94 is in circuit with motor 48 and controller 56, which is programmed to open the circuit when surface 96 is aligned with indicator 94 after a predetermined number of rotations, thereby positioning cylinder 16 at a desired orientation when the circuit is opened, to display the watch carried on holder 16 in the upright position.

In operation of the embodiment shown in FIG. 1–3, the user places watch 22 on watch holder 16, with watchband 24 around holder 16 and watch 22 on the outer face of holder 16. Holder 16 is then inserted into the end of cylinder 14, which is placed on the upper surfaces of rollers 38, 40, 44 and 46. Motor 48 is then energized either by controller 56 or manually with switch 54 causing cylinder 14 to rotate. If rotation of cylinder 14 and thereby watch 22 in the opposite direction is desired, cylinder 14 may be simply lifted, rotated 180°, and placed back on the rollers.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A watch winder comprising:

a) a cylinder having a given diameter, a given length, a longitudinal axis, a continuous outer wall, an interior, and opposed ends;

b) a watch holder insertable into the interior of said cylinder, said holder having an outer watch carrying face perpendicular to the longitudinal axis of said cylinder; and c) a cylinder rest to freely support said cylinder in a horizontal position, said rest including at least one drive surface positioned to engage and rotate said cylinder when said cylinder is supported on said rest.

2. The watch winder of claim 1, wherein said watch holder is compressible.

3. The watch winder of claim 1, wherein said drive surface includes a rotatable drive roller having an upper surface engaging said cylinder when said cylinder is supported on said rest.

4. The watch winder of claim 1, wherein said drive surface includes a rotatable drive belt having an upper surface engaging said cylinder when said cylinder is supported on said rest.

5. The watch winder of claim 1, wherein said drive surface is positioned to frictionally engage the outer wall of said cylinder.

6. The watch winder of claim 1, further including a motor in operative communication with said drive surface, and control circuitry controlling when said motor is energized.

7. The watch winder of claim 1, wherein said rest includes a pair of parallel rollers positioned along and transverse to a first longitudinal axis, said parallel rollers being separated at a distance less than the given length of said cylinder.

8. The watch winder of claim 1, wherein said rest includes rollers positioned along and transverse to first and second parallel longitudinal axes spaced at a distance less then the given diameter of said cylinder.

9. A watch winder comprising:

a) a cylinder having a given diameter, a longitudinal axis, a continuous outer wall of a given length, an interior, and opposed ends;

b) a watch holder insertable into the interior of said cylinder, said holder having an outer watch carrying face perpendicular to and axially aligned with the longitudinal axis of said cylinder; and c) a cylinder rest to support said cylinder in a horizontal position, said rest including a plurality of rollers having horizontal axes and upper edges in a common horizontal plane, at least one of said rollers being a motor-driven drive roller positioned to engage and rotate said cylinder when said cylinder is supported on said rollers.

10. The watch winder of claim 9, wherein said rest includes a first pair of parallel rollers positioned along and transverse to a first longitudinal axis, and a second pair of parallel rollers positioned along and transverse to a second longitudinal axis, said first and second longitudinal axes being parallel to each other and spaced at a distance less than the given diameter of said cylinder.

11. The watch winder of claim 9, wherein one of said rollers is a motor-driven drive roller and the other rollers are freely-rotatable rollers.

12. The watch winder of claim 9, wherein said cylinder includes radial flanges adjacent each end.

13. The watch winder of claim 9, further including a motor in operative communication with said drive surface, and control circuitry controlling when said motor is energized.

14. The watch winder of claim 9, wherein said motor-driven drive roller is positioned to frictionally engage said cylinder outer wall.

15. A watch winder comprising:

a) a cylinder having a given diameter, a longitudinal axis, a continuous outer wall of a given length, an interior, and opposed ends;

b) a watch holder insertable into the interior of said cylinder, said holder having an outer watch carrying face perpendicular to and axially aligned with the longitudinal axis of said cylinder; and c) a cylinder rest to support said cylinder in a horizontal position, said rest including first and second support sections having parallel longitudinal axes spaced from each other at a distance less than the given diameter of said cylinder, each of said sections including a housing having opposed ends and rollers adjacent the ends of said housing, the rollers of each section being perpendicular to and axially aligned with the section longitudinal axis, all of said rollers having upper edges in a common horizontal plane, and at least one of said rollers being a drive roller positioned to engage and rotate said cylinder when said cylinder is supported on said rollers.

16. The watch winder of claim 15, wherein said section housings are cylindrical housings having diameters less than the diameters of said rollers.

17. The watch winder of claim 15, further including an electric motor enclosed in one of said housings, said motor being in operative communication with said drive motor.

18. The watch winder of claim 15, wherein said cylinder includes radial flanges adjacent each end, the distance between the rollers of each support section being less than the distance between said flanges.

19. The watch winder of claim 15, further including an electric motor connected to said drive roller, said motor being in a circuit with a programmable controller.

20. The watch winder of claim 15, further including a battery enclosure, said cylinder rest being mounted on said battery enclosure.

21. A watch winder comprising:

a) a cylinder having a given diameter, a given length, a longitudinal axis, a continuous outer wall, a detectable feature, an interior, and opposed ends;

b) a watch holder insertable into the interior of said cylinder, said holder having an outer watch carrying face perpendicular to the longitudinal axis of said cylinder;

c) a cylinder rest to freely support said cylinder in a horizontal position, said rest including at least one drive surface positioned to engage and rotate said cylinder when said cylinder is supported on said rest; and d) an electrical circuit including an electric motor operatively connected to said drive surface, a controller for controlling the number of rotations of said cylinder, and a sensor to detect the position of said detectable feature, said circuit being opened in response to detection of said detectable feature by said sensor.

22. The watch winder of claim 21, wherein said detectable feature is a reflective surface on the outer wall of said cylinder.

23. The watch winder of claim 21, further including an LED display for displaying the number of rotations of said cylinder.

24. The watch winder of claim 21, wherein said drive surface includes a rotatable drive roller having an upper surface engaging said cylinder when said cylinder is supported on said rest.

25. The watch winder of claim 21, wherein said controller is programmed to open said circuit when said detectable feature is aligned with said sensor.

* * * * *